United States Patent [19]

Hatfield

[11] Patent Number: 5,333,902
[45] Date of Patent: Aug. 2, 1994

[54] PORTABLE MOTOR VEHICLE SAFETY AIRBAG

[76] Inventor: J. Paul Hatfield, 5083 Cannon Bluff Dr., Woodbridge, Va. 22192

[21] Appl. No.: 157,736

[22] Filed: Nov. 24, 1993

[51] Int. Cl.$^5$ ............................................. B60R 21/18
[52] U.S. Cl. ............................................. 280/733
[58] Field of Search ................... 280/733, 735, 801 R

[56] References Cited

U.S. PATENT DOCUMENTS

| | | | |
|---|---|---|---|
| 3,820,842 | 6/1974 | Stephanson | 280/733 |
| 3,929,348 | 12/1975 | Lawwill | 280/733 |
| 4,348,027 | 9/1982 | Law et al. | 280/733 |
| 5,162,006 | 11/1992 | Yandle, II | 280/733 X |
| 5,242,193 | 9/1993 | Humpal | 280/733 |

FOREIGN PATENT DOCUMENTS

| | | | |
|---|---|---|---|
| 4232041 | 4/1993 | Fed. Rep. of Germany | 280/733 |
| 2606719 | 5/1968 | France | 280/733 |

Primary Examiner—Margaret A. Focarino
Assistant Examiner—Christopher P. Ellis
Attorney, Agent, or Firm—Harold H. Dutton, Jr.

[57] ABSTRACT

A portable airbag device for use in an automotive vehicle having passenger seat belts therein, the device comprising a housing having a projecting male buckle element and a female buckle receiving element for insertion between the two buckle elements of the seat belt system, the housing also including a source of compressed gas and a sensor for detecting the occurrence of a collision, a pouch extending along the passenger seat belt and including an inflatable airbag connected to the source of compressed gas, and a releasable fastener for securing the pouch to the passenger seat belt and positioning the pouch in front of a user, whereby upon occurrence of a collision, the sensor detects the collision and inflates the airbag.

7 Claims, 2 Drawing Sheets

PORTABLE MOTOR VEHICLE SAFETY AIRBAG

This invention relates to a motor vehicle safety airbag. More particularly, the invention relates to an airbag which is portable in the sense that it can be moved from one vehicle to another, whereby it can be used with vehicles which are not originally equipped with safety airbags.

BACKGROUND AND OBJECTS OF THE INVENTION

In recent years, motor vehicle safety standards have been instituted which require that all new motor vehicles intended for ordinary passenger car use must be equipped with inflatable "air bags" for the protection of the occupant. Initially, the requirements have been met by providing a single airbag for driver protection, but ultimately both driver and passenger airbags will be required.

The technology used with airbags has been known in the patent art for a number of years, and many variations have been developed for airbags. Thus, some devices are made to protect the occupant from frontal injuries, while others protect from both frontal and side injuries. Some devices are built into the dashboard or steering wheel of the vehicle, while others are produced in combination with the seat belt.

For example, U.S. Pat. No. 5,062,662 provides an airbag which is integral with the lap belt, and U.S. Pat. No. 4,971,354 provides such an airbag integral with a shoulder belt.

Unfortunately, in spite of the demonstrated ability of airbags to reduce serious injury in the event of a collision, many vehicles manufactured prior to current safety standards are still in use. In addition, many trucks are not within the scope of the requirements for airbags, so that no airbag protection is available for such trucks. Thus, there are a great many vehicles currently in use, and which will be in use for many years, which do not have airbags, and which cannot be easily retrofitted with airbags. The cost to install airbags on older vehicles would be quite high, and the older the vehicle, the less likely the owner would be to pay for such an expensive installation.

The primary object of the present invention is to provide an airbag which may be used with older model vehicles to provide occupant protection.

Another object of the invention is to provide an airbag which may be transferred from one vehicle to another without vehicle modification.

Still another object of the invention is to provide an airbag which can be used either on the driver or passenger side of a vehicle.

Yet another object of the invention is to provide an airbag which may be used on vehicles which were not originally equipped with airbag occupant protection.

These and other objects and advantages of the invention will become apparent from a detailed consideration of the invention as described in the following description and claims.

DESCRIPTION OF THE INVENTION

The airbag of the present invention is a device which is portable in the sense that it can be transferred from one vehicle to another without modification of the vehicle. The airbag device is intended to be used in combination with a conventional seat belt, and as such it is useable on any vehicle which is equipped with seat belts. Thus, the device may be used with small or large trucks or even with, for example, agricultural or industrial tractors, so long as the vehicle is provided with seat belts.

The airbag device is used between the two buckle components of the seat belt system on the vehicle. Conventional seat belts have a male projecting buckle element and a female buckle element into which the male element is releasably inserted. Typically, the female buckle element is anchored to the floor of a vehicle, while the male buckle element is attached to the end of the belt. The belt is withdrawn from a seat belt retractor and extended around the user, until the male buckle element is inserted into the female buckle element. The airbag device of this invention is adapted to be inserted in between the male and female buckle elements. Thus, the airbag device has a female buckle element on one end and a female buckle element on the other end. In this manner, the device is inserted between the male and female buckle elements of the seat belt.

Extending from the device is an elongated receptacle which ordinarily houses the actual inflatable bag. The receptacle is of a sufficient length to extend upwardly in front of the user to a position preferably approximately in front of the chest of the user. The receptacle is provided with an attaching strap secured by a hook-and-loop fastener for securing the receptacle around the belt and holding the receptacle in this position.

The buckle housing is provided with a sensing system for detecting a collision event in order to deploy the airbag. This sensing system may take a number of different forms. For example, a tension sensor may be used to detect the amount of tension applied on the device between the male and female buckle elements. When this tension exceeds a predefined limit, as when a user is thrust forward during a collision, the airbag is deployed.

Other types of sensing systems could also be used such as, for example, a strain gauge to detect the amount of tension, or a sensor associated with the bag receptacle for detecting the pressure exerted against the belt by the users body and sending a signal to the actuating means in the buckle housing.

The buckle housing also preferably houses the gas used to inflate the airbag in a small canister within the housing. Alternatively, the device could be connected to a remote canister which could be stored on or beneath the users seat in any convenient location, and connected by a tubing to the airbag.

DESCRIPTION OF THE DRAWINGS

The invention will be described in greater detail in reference to the accompanying drawings which show by way of non-limiting example, a preferred embodiment of the invention, and in which.

DETAILED DESCRIPTION OF PREFERRED EMBODIMENTS

Figure 1:
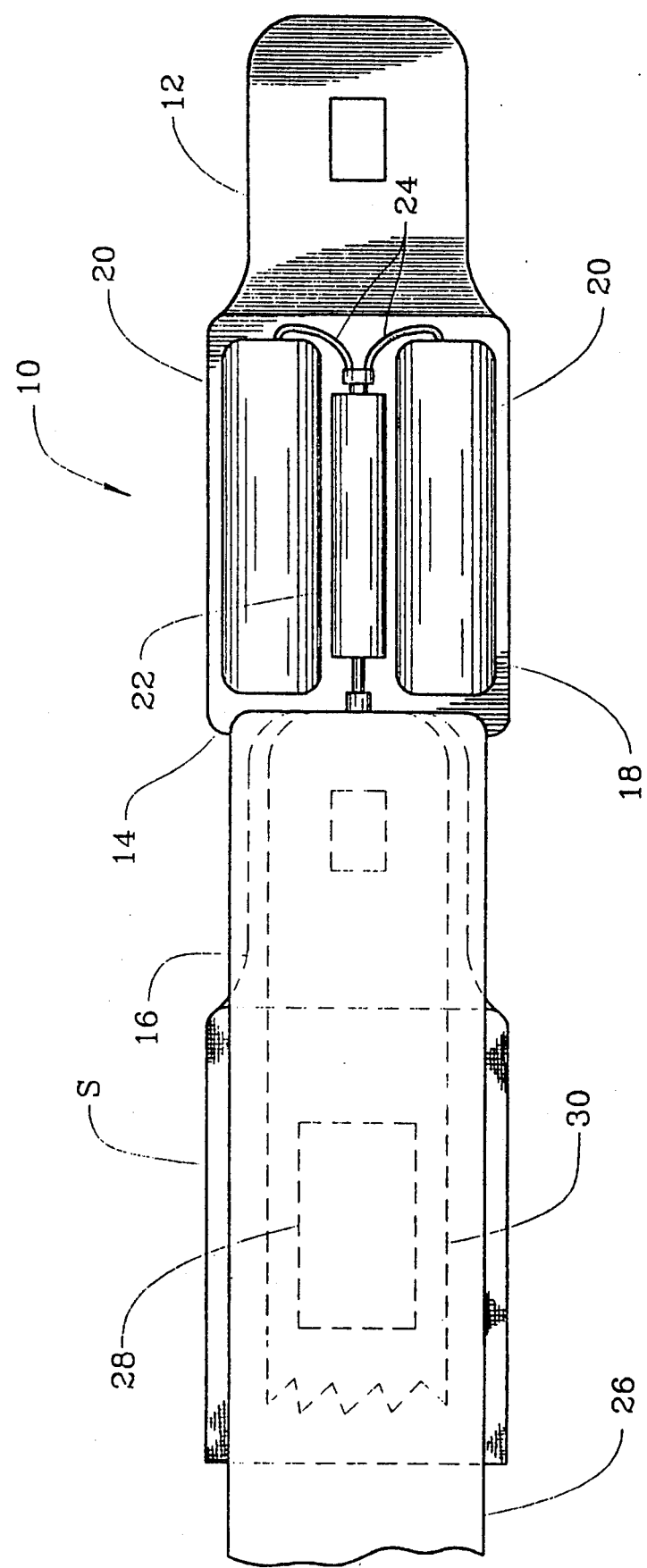
FIG. 1 is a plan view of the safety airbag device according to the invention.

Referring to FIG. 1, the safety airbag device according to the invention is generally designated 10, and is seen to be provided with a male buckle 12 and a female buckle receptacle element 14. The male tab 12 is adapted to be inserted into the conventional female belt receptacle in a motor vehicle (not shown) while the female receptacle 14 of the invention is adapted to receive the conventional male buckle element 16 of the motor vehicle seat belt S.

The device 10 includes a housing 18 which is adapted to house compressed gas cartridges 20 and a sensor mechanism 22 which is connected by means of conduits 24 to the cartridges 20. The sensor mechanism 22 is appropriately connected to or mounted on the housing 18, so that in the event of a collision, the sensor mechanism 22 causes a release of the compressed gas into an airbag housed within the elongated receptacle or pouch 26. The receptacle or pouch 26 is secured in place to the seat belt S by any suitable means, particularly such as a strip 28 of hook-and-loop fastener with a complementary strip secured to the seat belt. Alternatively, a strip may be positioned so as to encircle the seat belt S and be secured thereto by similar fastener material on the strip. In this manner, the pouch 26 would be free to slide slightly around the seat belt. The pouch 26 is of any suitable construction which houses the airbag 30 in a deflated state, but opens to release the airbag and allow it to inflate in a collision. Alternatively, the airbag may simply be folded to the stored condition and secured in that position by releasable fasteners, for release upon collision.

In use, the buckle element 16 of the seat belt S is inserted into the female buckle portion 14 of the airbag device, and the male portion 12 is inserted into the female receiving portion of the seat belt. The pouch 26 containing the airbag 30 then extends along the seat belt and is secured to the belt. Essentially the pouch is of minimal thickness when the airbag is in the uninflated state, and is of a width approximately the same as the seat belt. The length is such as to position the airbag appropriately with respect to the average user. When the user changes to a different vehicle, the buckles are released in the usual manner and the fastener element is removed from the belt, so that the airbag device is easily transported to another vehicle and reinstalled.

The sensor system 22 may be any appropriate means for detecting the occurrence of a collision. For example, the sensor may detect the tensile force between the buckle 16 and the receptacle 14, and upon reaching a predetermined force trigger the release of the compressed gas so as to inflate the airbag.

Figure 2:
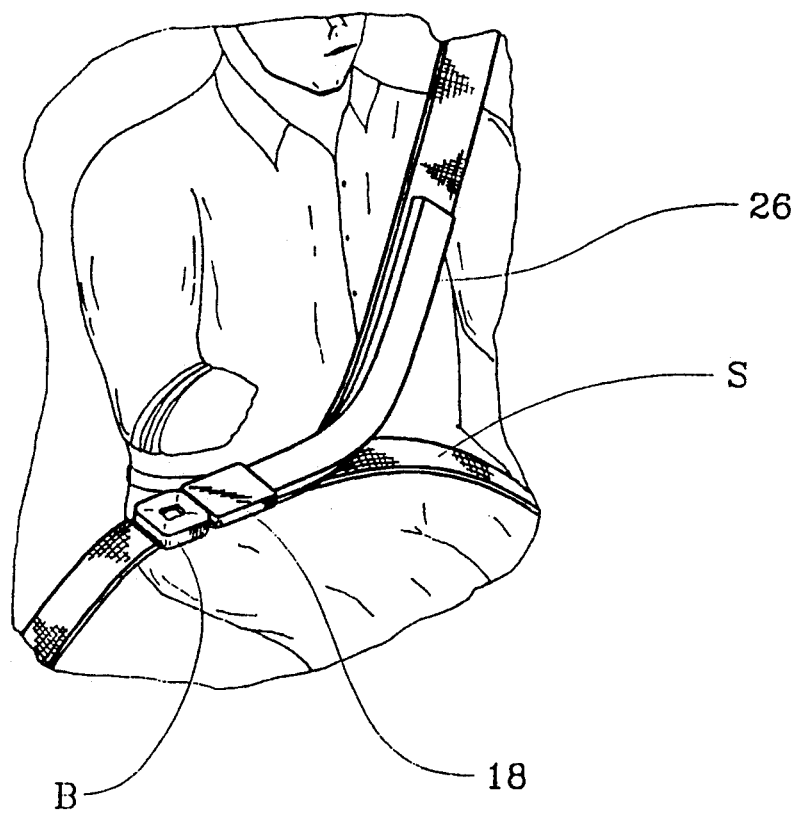
FIG. 2 is a schematic representation illustrating the manner in which the safety airbag device is used by a vehicle occupant.

Referring to FIG. 2, the airbag device is shown in an installed position and in use by a passenger in an automobile. The housing 18 is shown installed between the female buckle element B and the belt S of a typical automotive seat belt system. The pouch 26 containing the airbag 30 extends upwardly along the shoulder harness portion of the seat belt system, in order that the airbag be positioned in front of the chest of the user. In the event of a collision, the sensor mechanism triggers the release of the compressed gas from the canisters 20, thereby inflating the airbag in a known manner.

While this invention has been described as having certain preferred features and embodiments, it will be understood that it is capable of still further variation and modification without departing from the spirit of the invention, and this application is intended to cover any and all variations, modifications and adaptations as may fall within the spirit of the invention and the scope of the appended claims.

I claim:

1. An airbag device for use in an automotive vehicle of the type having passenger seat belts therein, said device comprising a housing having a projecting male buckle element and a female buckle receiving element, said housing including a source of compressed gas and sensor means for detecting the occurrence of a collision, pouch extending along the passenger seat belt and including an inflatable airbag connected to said source of compressed gas, and means for securing said pouch to the passenger seat belt and positioning said pouch in front of a user, whereby upon occurrence of a collision, said sensor means detects the collision and inflates said airbag.

2. An airbag device as in claim 1 and wherein said sensor means includes means for detecting the exertion of tensile force exceeding a predetermined value between said male buckle element and said female buckle receiving element.

3. An airbag device as in claim 2 and wherein said securing means comprises an elongated strap having ends secured to each other around the seat belt.

4. An airbag device as in claim 3 and wherein said securing means comprises a releasable fastener.

5. An automotive seat belt having first and second sections thereof secured by means of a male seat belt buckle element on one section and a female seat belt buckle element on the other section, an airbag device comprising a housing having a projecting male seat buckle element releasably secured in said female seat belt buckle element and a female buckle receiving element having said male seat belt buckle element releasably secured therein, said housing including a source of compressed gas and sensor means for detecting the occurrence of a collision, a receptacle extending along one of said seat belt sections and including an inflatable airbag therein connected to said source of compressed gas, and means for securing said receptacle to said seat belt section and positioning said receptacle and said airbag in front of a user, whereby upon occurrence of a collision, said sensor means detects the collision and inflates said airbag.

6. An automotive seat belt as in claim 5 and wherein said sensor means comprises means for detecting the force exerted between said male and female seat belt buckle elements and triggering the release of compressed gas and inflation of said airbag when the force detected exceeds a predetermined threshold value indicative of a collision.

7. An automotive seat belt as in claim 6 and wherein said sensor means includes a strain gauge.

* * * * *